June 15, 1965
B. C. BLAIR
3,188,687
VIBRATORY IMPRESSION PRODUCING APPARATUS
AND FILM HOLDER THEREFOR
Filed Sept. 27, 1962
3 Sheets-Sheet 1
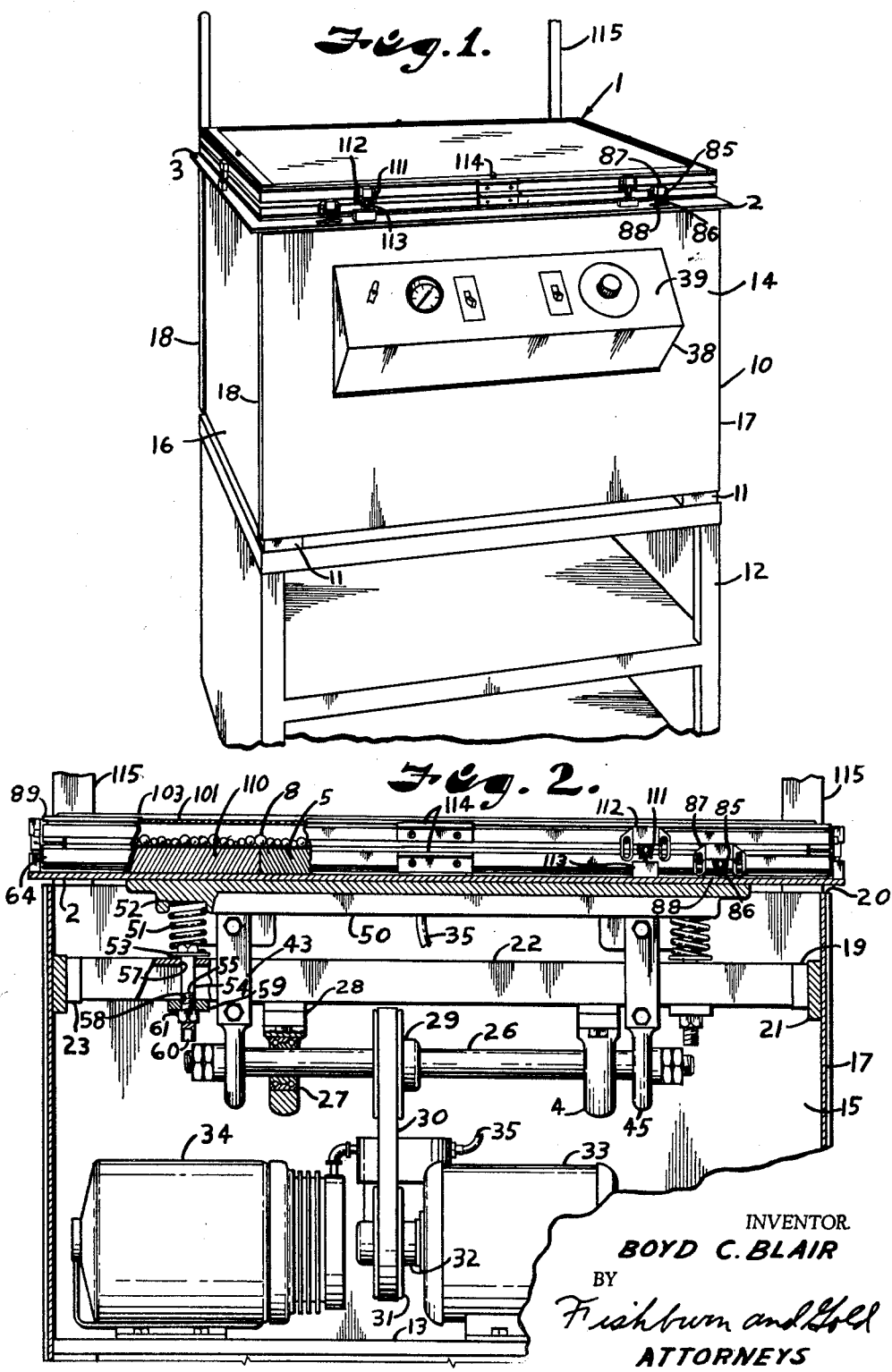
INVENTOR.
BOYD C. BLAIR
BY
Fishburn and Gold
ATTORNEYS

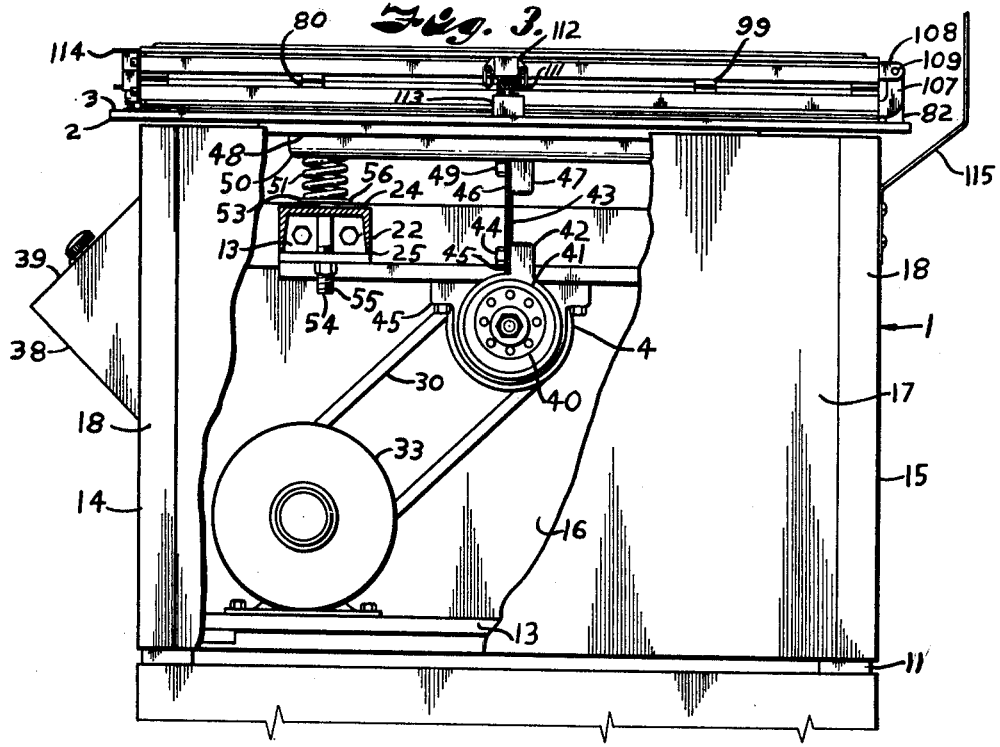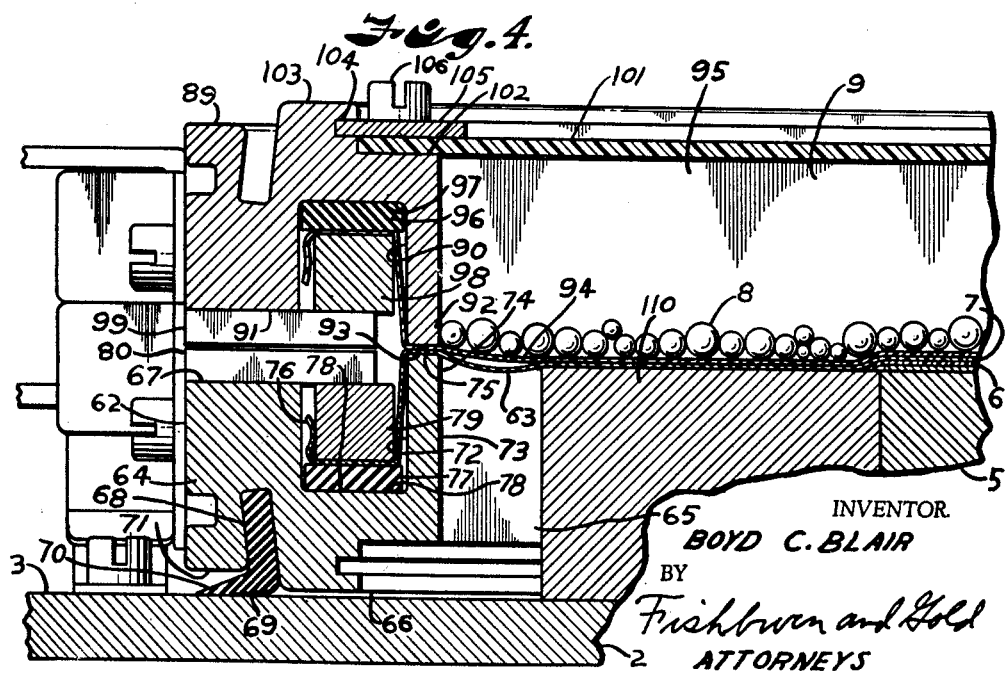

June 15, 1965

B. C. BLAIR 3,188,687

VIBRATORY IMPRESSION PRODUCING APPARATUS
AND FILM HOLDER THEREFOR

Filed Sept. 27, 1962

INVENTOR.
BOYD C. BLAIR
BY
Fishburn and Gold
ATTORNEYS

United States Patent Office 3,188,687
Patented June 15, 1965

3,188,687
VIBRATORY IMPRESSION PRODUCING APPARATUS AND FILM HOLDER THEREFOR
Boyd C. Blair, Topeka, Kans., assignor to Brackett Stripping Machine Co., Inc., a corporation of Kansas
Filed Sept. 27, 1962, Ser. No. 226,573
8 Claims. (Cl. 18—1)

This invention relates generally to apparatus for producing impressions from items or forms having a surface with characters and/or designs in relief or an intaglio surface, and more particularly to such apparatus wherein the impressions are made on a thin sheet of suitable sensitized or formable material overlying such item or form by impacting the sheet with a plurality of small impact members in response to vibratory movement imparted thereto. The invention further relates to such apparatus wherein a film is supported in sealed relation to a frame and held against movement relative thereto in response to forces as by the impact members and fluid pressure differentials applied toward the faces of the film.

The principal objects of the present invention are to provide an impression producing apparatus having a table adapted to have an item or form positioned thereon with the sheet on which impressions are to be made positioned in overlying relation to the character or design bearing surface thereof and a frame removably mounted on said table in sealed relation thereto and surrounding said item or form with a film having margins mounted on said frame in sealed relation thereto and extending in overlying relations to said sheet wherein the film is held against movement relative to the frame in response to forces applied toward the faces of the film; to provide such a frame and film structure to act as a vacuum frame; to provide such a structure with an exhaust connection to the table for withdrawing air from between the table and film whereby the film is drawn toward the table and applies pressure to the sheet to hold same against the item or form surface; to provide such an apparatus with a cell removably positioned on said frame and having a flexible thin bottom wall and a multiplicity of impact members loose in the cell whereby vibration of the table effects vertical movement of the impact members to apply multiple impacts transmitted through said bottom wall and film to the sheet overlying the surface of the item or form; to provide such a structure wherein the cell is a second frame with the flexible bottom wall a film having marginal portions secured to said second frame in substantially the same manner as the film of the first frame is secured thereto; to provide such a structure wherein the vibratory movement imparted to the table is such that the impact members in a chamber in the cell are distributed over the bottom wall thereof and remain substantially uniform in distribution; to provide such a structure wherein mechanical connections between an actuator and the vibratory table are constructed for positive vibratory movement of the table with uniform vertical movement over the area of the table both as to amplitude and frequency; to provide such a structure wherein the amplitude of the vibrations is adjustable; to provide a film holder including a frame with a continuous groove therearound and having a flexible seal member in the groove for the length thereof with the film extending across the frame and having marginal portions in the groove and a rigid bar held in the groove to tightly engage the film margin and hold same in sealing relation to the frame and to prevent relative movement of the film margins relative to said frame; and to provide an apparatus for producing impressions by vibratory impacting that is simple in construction, efficient in operation, easily adjusted and that provides an operator with easy access to the impression sheet and form.

Other objects and advantages of this invention will become apparent from the following description taken in connection with the accompanying drawings wherein are set forth by way of illustration and example certain embodiments of this invention.

FIG. 1 is a perspective view of an impression producing apparatus embodying the features of the present invention.

FIG. 2 is an elevational view of the impression producing apparatus with portions broken away to illustrate the vibration actuator and connections to the table.

FIG. 3 is an end elevation of the impression making apparatus with portions broken away to show the drive and the resilient support for the table.

FIG. 4 is an enlarged partial sectional view through the table and the vacuum frame and impact member containing cell.

Figure 5:
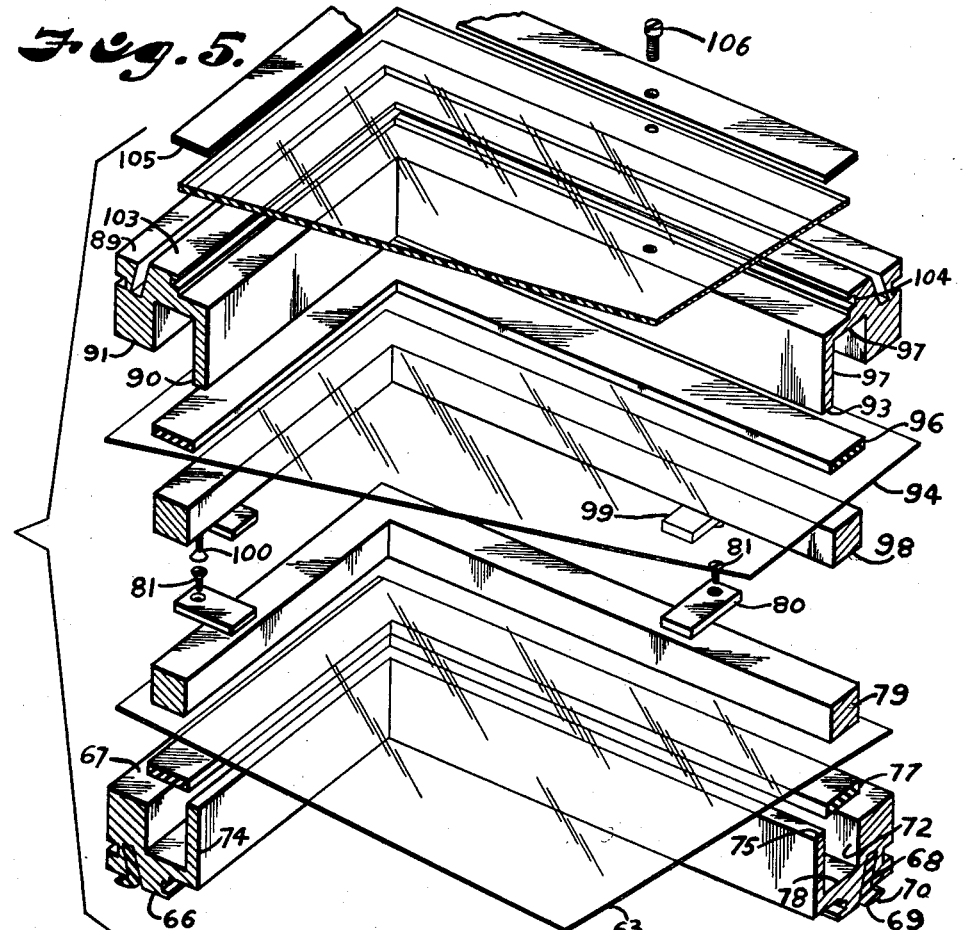
FIG. 5 is a partial disassembled perspective view of the vacuum frame and the impact member cell.
Figure 6:
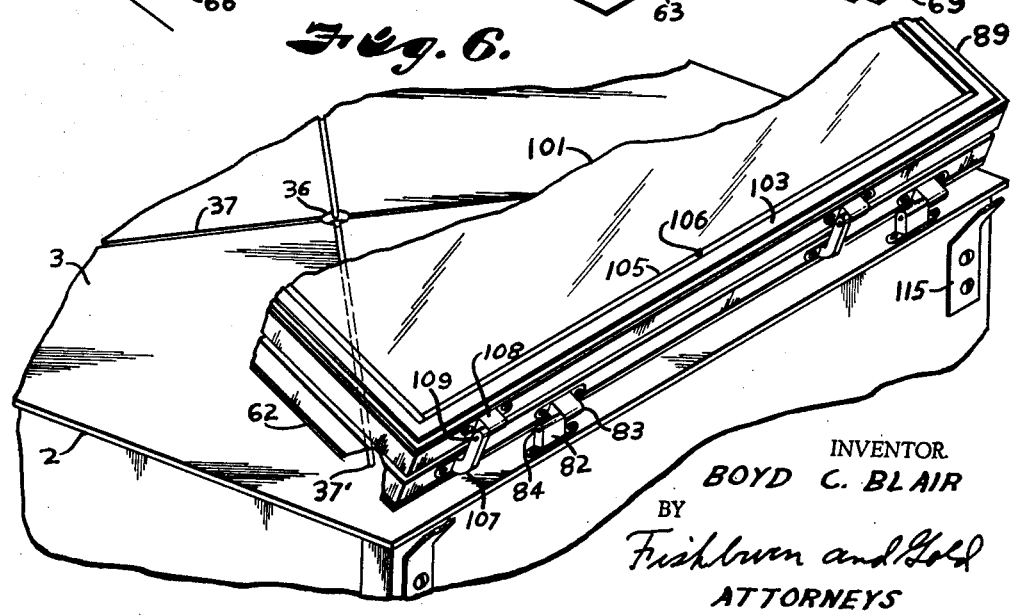
FIG. 6 is a partial perspective view of the table with the vacuum frame and cell showing the hinged connections thereof.

Referring more in detail to the drawings:

The reference numeral 1 generally designates apparatus for producing impressions by vibratory impacting and includes a table member 2 having an upper surface 3 that is flat and preferably horizontal. The table member 2 is operatively connected with actuating apparatus 4 for imparting substantially uniform vertical vibratory movement to the table. The impression producing apparatus is preferably such that a printing form or type block 5 is arranged on the table surface 3, said form or block having an upper surface 6 with characters and/or designs in relief or intaglio. A sheet 7 of suitable impression receiving material is arranged in overlying relation to the surface 6 and is suitably held in position and then impacted by a plurality of small impact members 8 such as balls contained in a suitable cell 9 positioned over the sheet 7 whereby the members 8 have vertical movement in response to vibratory movement of the table member 2. With the surface 6 representing material to be reproduced in a printing plate, the sheet 7 after suitable impacting will carry an impression and may then be treated whereby it will form a negative used for exposing a sensitized plate that may be etched or otherwise processed to form the printing plate.

In the structure illustrated, the apparatus 1 includes a housing 10 suitably supported by resilient members 11 such as rubber blocks or feet arranged on a base or other suitable support such as a rigid cabinet 12. The housing structure 10 has a bottom frame 13, front and rear walls 14 and 15, opposed side walls 16 and 17 rigidly connected together to define an open top housing. In the structure illustrated, the front and rear walls 14 and 15 have flanges 18 overlying adjacent portions of the side walls and secured thereto to impart rigidity to the housing. The bottom frame 13 is suitably secured to the front, rear and side walls to add to the rigidity of the structure.

An upper frame 19 is arranged in the housing and is spaced below the upper edges 20 of the walls thereof, said upper frame in the illustrated structure consisting of rigid bar-like members 21 secured to the inner faces of the side walls 16 and 17 and extending across the width thereof. The frame 19 also includes laterally spaced rail members 22 having ends 23 suitably secured to the frame members 21. In the illustrated structure, the rail members 22 are in the form of channels with webs 24 at the upper portion thereof and flanges 25 depending therefrom, said rails 22 preferably being equally spaced from a median vertical plane extending through the table member 2.

A shaft 26 is preferably supported in substantially horizontal relation and rotatably mounted in bearings 27 carried by spaced blocks 28 suitably secured in depending relation to the rails 22 to rotatably mount the shaft 26 with its axis in said median plane. The shaft 26 is suitably driven as by a pulley 29 fixed thereto and operatively connected by a belt 30 with a pulley 31 on a shaft 32 of a motor 33, said motor preferably being suitably secured or supported on the bottom frame 13. A motor-driven vacuum pump 34 is also preferably carried by the bottom frame 13 to draw air through a conduit 35 that has its inlet connected to the table member 2 and communicating with a central opening 36 extending to the upper surface 3 of said table member 2, said upper surface 3 having grooves 37 extending outwardly from the opening and terminating as at 37' in spaced relation to edges of the table member 2 whereby operation of the pump 34 will draw air from above the table top surface 3. The front wall 14 of the housing has an outwardly extending portion 38 providing an inclined wall 39 adapted to carry controls and meters as may be desired in the operation of the apparatus.

Each of the end portions of the shaft 26 preferably outwardly of the bearings 27 are provided with eccentric structures 40 providing an adjustable throw. Each of the eccentric structures have eccentric straps 41 rotatable thereon with each of said eccentric straps having a lug 42 to which is secured one end of a respective leaf spring connector 43 by a suitable fastener such as a screw 44 whereby, in response to rotation of the shaft 26, a reciprocatory motion is imparted to the leaf spring connectors 43. In the illustrated structure, the lug 42 is offset whereby it has a face 45 on which the respective leaf spring connector is engaged. The leaf spring connectors 43, in the illustrated structure, each consist of two or more thin flat springs and are preferably arranged whereby a centrally positioned face thereof is substantially in the vertical plane that extends through the center of the table member 2 and the axis of the shaft 26. The other ends of the leaf spring connectors are engaged with faces 46 of respective lugs 47 that depend from a sub-table member 48, said leaf spring connectors being secured to the respective lugs 47 by suitable fastening devices such as screws 49, said leaf spring connectors each being equally spaced from the center of the table member 2.

The sub-table 48 has the table member 2 suitably secured thereon and has spaced depending elongate portions 50 serving to provide rigidity and which have portions above the rails 22. The sub-table 48 and table member 2 thereon are resiliently supported by means of a plurality of resilient members 51 each having an upper end engaged in a respective recess 52 in the depending portions 50 of the sub-table and a lower end engaged with the head 53 of an adjusting member 54. In the illustrated structure, each of the resilient members 51 are in the form of coil springs, there being four in number with two on each side of and equally spaced from the median plane of the table member 2. Also, the springs are arranged whereby two are on each side and equally spaced from a transverse median plane, the intersecting line of the median planes extending substantially vertically through the center of the table member 2 whereby each of the springs are equally spaced from said center line. In the illustrated structure, the adjusting members 54 each consists of a threaded member or shank 55 with the head 53 provided with a flange 56 on which the lower end of the respective spring 51 seats, the lower end surrounding the head portion 53 above the flange. The shank 55 extends downwardly through a bore 57 in the web 24 of the respective channel member or rail 22 and the threaded portions 55 of the shanks are screwed through threaded bores 58 in plate members 59 that extend transversely below the flanges 25 and are suitably secured thereto as by welding. The lower end of each shank 55 has a socket 60 to receive a suitable wrench or the like for rotating the shanks to adjust same up and down to raise or lower the springs 51 and the table structure. The adjusting members may be adjusted individually to level the table member 2 and also when in a selected position a lock nut 61 is threaded on the lower end of each threaded shank 55 into engagement with the plate 59 to hold the adjusting members in position. The leaf spring connectors 43 and the resilient members 51 cooperate in positioning the table, the adjustment of the resilient members 51 in cooperation with said leaf spring connectors providing for leveling of the upper surface 3 of the table member 2 and, in operation, the motor drives the shaft 26 rotating the eccentric structures to provide an oscillatory motion through the leaf spring connectors 43 to the table structure, imparting a vertical motion thereto. The adjusting members are adjusted also whereby the vibratory motion imparted to the table member 2 is uniform over the entire area both as to amplitude and frequency.

A film holding vacuum frame 62 is removably mounted on the table 2 and carries a thin flexible film or sheet 63 adapted to be positioned in overlying relation to the sheet 7, the frame having sealing engagement with the table top surface 3 whereby operation of the pump 34 will draw air from within the vacuum frame pulling the film 63 downwardly to hold firmly the sheet 7 in overlying position relative to the surface 6 of the form. In the structure illustrated, the vacuum frame 62 includes a unitary rigid frame member 64 which, in the illustrated structure, is rectangular, defining a space 65 between opposed portions. The frame member 64 is preferably of substantially uniform cross-section and has a lower face 66 and an upper face 67. A groove 68 extends generally upwardly in the frame member 64 from the lower face 66, said groove being continuous around the frame member and having a resilient seal member or strip 69 positioned therein for the entire length of said groove. The lower edge of the seal member 69 has an outwardly extending flange 70 adapted to engage the upper surface 3 of the table member 2 in sealed engagement when the vacuum frame is positioned on said table member, the engagement being outwardly from the ends of the grooves 37. To accommodate the flange 70, the outer lower portion of the frame 64 is cut away or recessed therearound as at 71. A groove 72 extends downwardly in the frame member 64 from the upper face 67, said groove 72 being spaced outwardly from the inner faces 73 of the frame member 64, said frame member having an upwardly extending portion or flange 74 inwardly of said groove 72 and terminating in a surface 75 above the upper surface 67 of the frame member 64. The flange 74 and groove 72 extend continuously around the frame and are arranged to receive marginal portions 76 of the film or sheet 63 and fastening means therefor. The film 63 also must have sealed engagement relative to the frame member 64, and further must be secured to prevent relative movement between the marginal portions of the film and the frame member. It is preferred that the film 63 be of a tough material with good elongation and impact resistance and that it be dimensionally stable under usual temperature and humidity variations. It has been found that a suitable material is polyethylene terephahtlate, such a film being sold under the trade name "Mylar" by E. I. du Pont de Nemours & Company, Inc., Wilmington, Delaware. To hold and seal the marginal portions of the film 63, a resilient or elastic strip 77, as for example a rubber strip, is arranged in the groove 72 and extends continuously around the frame member in seated engagement with the bottom face 78 of said groove. The marginal portion of the film or sheet 63 extends over the surface 75 of the flange 74 and then downwardly in the groove 72 to overlie the resilient strip 77. A bar member 79 preferably of continuous rectangular shape generally corresponding to the groove 72 is inserted therein to force the marginal portion of the film 63 into engagement with the upper surface of the resilient member or strip 77. The bar member 79 is held in place by suitable clamps, as for example a plurality of plates 80, mounted on the upper surface 67 of the frame member and tightened into position by suitable fastening devices such as screws 81 to clamp the bar, film margins and resilient member 77 into a tight sandwich structure with the bottom of the groove to form a seal and securely hold the marginal portions of the film or sheet 63 in the frame member 64.

It is preferred that the vacuum frame be easily moved to provide access to forms and the positioning thereof on the surface 3 of the table 2, and also that the vacuum frame be easily removable. In the illustrated structure, spaced lugs 82 are secured to the rear portion of the table 2 and the rear portion of the frame member 64 has rearwardly extending lugs 83 with hinge pins fixed to one set of lugs and extending through apertures 84 of the others to form a removable hinge connection between the vacuum frame and table. Also, in the illustrated structure, there are a plurality of separable spring clip structures or latches 85 mounted on the table 2 and the outer periphery of the vacuum frame 62 to provide friction latches for holding the frame in position on the table top when said frame is in overlying relation thereto. In the structure illustrated, each of the spring latches 85 include upstanding lug members 86 secured to the table as one of the sections and the other section 87 is mounted on the frame periphery and has bifurcated or spaced fingers 88 adapted to receive the lugs 86 therebetween with a resilient gripping action to form the spring latch.

The cell 9 is adapted to be positioned in overlying relation to the vacuum frame 62 and is preferably removably mounted relative thereto. In the structure illustrated, the cell 9 has a frame member 89 that is preferably substantially of the same structure and cross-section as the frame member 64, but is inverted relative thereto. With the structure of the frame members, the same basic frame member can be used both for the vacuum frame or for the cell. The frame member 89 of the cell being in inverted position relative to the frame member 64 of the vacuum frame has a film margin receiving groove 90 extending upwardly from a lower face 91 with a depending flange 92 extending below said face 91 and terminating in a face 93 inwardly of the groove 90. A flexible film or sheet 94 extends across the frame to form the lower wall of a cell chamber 95 and said film is preferably of the same material as the film or sheet 63 and has marginal portions extending under the face 93 and into the groove 90 in underlying relation to a resilient strip 96 that extends for the full length of the groove 90 and is positioned therein in engagement with the upper surface 97 thereof. The marginal portion of the film 94 is held in clamping engagement with the resilient member or strip 96 by means of a continuous bar 98 that corresponds to the bar member 79 and is held in position by clamp plates 99 secured in place by suitable fastening devices such as screws 100 whereby the bar 98 provides a clamping sandwich arrangement of the marginal portions of the film 94, the resilient member 96 and the upper surface 97 of the groove to hold the film margins against movement relative to the frame member 89. A top wall 101 is secured on the frame 89 in upwardly spaced relation to the film 94 to cooperate with the inner portion of the frame 89 and the film 94 to define the chamber 95. It is preferred that the top wall 101 be a generally rigid transparent plastic panel with marginal portions resting on a ledge 102 extending around the inner portion of the frame 89 in downwardly spaced relation to the upper surface 103 thereof. Between the ledge 102 and the upper surface 103 of the frame 89 an outwardly extending groove 104 is arranged to receive an edge portion of bars 105 adapted to overlie the upper surface of the top wall 101 and form a key to retain same in position. The bars 105 are secured to the frame 89 in clamping relation to the top wall 101 by suitable fastening devices such as screws 106. The chamber 95 is adapted to contain a plurality of impact members 8 which are preferably in the form of balls, as illustrated in FIG. 4, there preferably being sufficient quantity of the balls to at least cover the surface of the film 94.

The frame 89 of the cell is preferably removably hinged relative to the vacuum frame 62. In the structure illustrated, the vacuum frame 62 and the cell 9 each have cooperating lugs 107 and 108 respectively at the rear thereof with the lugs of one having a pin that extends into an aperture 109 of the lugs of the other to form a separable hinge. In the structure illustrated, there are two such lugs on each of said frames arranged in spaced relation and also spaced from the hinge lugs that removably hinge the vacuum frame relative to the table member 2. With this arrangement, the cell frame may be hinged upwardly relative to the vacuum frame or may be removed entirely therefrom.

In using an apparatus constructed as described, the vacuum frame and cell frame hinged upwardly relative to the table and a form 5 with a surface 6 thereon from which an impression is to be made is positioned on the table surface 3. If the form is substantially smaller than the interior of the frame 64, spacer blocks 110 preferably are arranged on the table surrounding the form 5 to substantially fill up the space and prevent excessive deformation of the film 63 when vacuum is applied. Then the sheet 7 is arranged in overlying relation to the surface 6 and the vacuum frame 62 is hinged downwardly to overlie the table and surround the form and spacers, the sealing strip engaging the table surface 3 to form a seal between the vacuum frame and table. In this arrangement, the spring latches 85 hold the vacuum frame in place relative to the table and the film 63 is in overlying position relative to the sheet 7. The pump 34 is then actuated to draw air from within the frame between the film 63 and table top which draws the film 63 downwardly to tightly hold the sheet 7 in overlying relation to the surface 6. Then the cell 9 is swung downwardly into overlying relation to the vacuum frame. In this position, spring latches 111 having separable sections 112 and 113 on the periphery of the frame 89 and the top of the table member 2 respectively are engaged to hold the cell frame in position, this providing cooperative relation to aid in holding the vacuum in position. With this arrangement, the balls 8 rest on the film 94 which is in overlying relation to the film 63. The motor 33 is then energized rotating the shaft 26 to transmit vibratory movement through the spring connectors to the table member 2, providing a uniform vertical vibratory movement to the table member and to the balls in the ball chamber 95 of the cell. The vibration is uniform over the entire area as to amplitude and frequency. This movement causes the balls to move up and down, providing impacts that are transmitted through the film 94 and film 63 to the sheet 7 forming an impression of the surface 6 on said sheet 7. After the vibration has continued for a suitable period of time, the motor 33 is stopped and a handle 114 on the cell frame is grasped to swing the cell upwardly against stops 115 secured to the rear portion of the machine housing. It is preferred that the film 63 be transparent so that with the cell frame swung upwardly there is a view of the sheet 7 to give an indication as to whether or not the proper impression has been made. If the impression is suitable, the vacuum in the vacuum frame is released and said vacuum frame swung upwardly to provide access to the sheet 7 which is then removed and is suitably processed to serve as a negative or the like for making printing plates.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. In a reproduction impression producing apparatus wherein an impression is made on a sheet overlying an impression surface of a printing form by vibratory impacting said sheet by a plurality of impact objects comprising, (a) a horizontal vibratory table having an upper face adapted to receive thereon a printing form, an impression sheet overlying an upper impression printing form surface,
(b) said table having an exhaust connection for withdrawing air from above said table,
(c) a frame mounted on said table in surrounding relation to a printing form positioned on said table, said frame having sealing engagement with the upper face of said table,
(d) an upwardly facing flexible seal member on said frame and extending therearound,
(e) an impervious flexible film extending across said frame and adapted to overlie a printing form on said table upper face and having marginal portions in overlying engagement with the flexible seal member,
(f) a rigid bar coextensive with said flexible seal member and secured to said frame to tightly engage the film margins to hold same in air-tight sealing engagement with the flexible seal member so that in response to exhaust of air from above the table within the frame said film is drawn toward said table to hold an impression sheet and printing form thereon,
(g) and movable means positioned over said film and responsive to vibratory movement of the table to impact the area of said film in small portions and transmit said impacts through the film to an impression sheet thereunder.

2. In a reproduction impression producing apparatus wherein an impression is made on a sheet overlying a character and design carrying surface of a printing form by vibratory impacting said sheet by a plurality of impact objects comprising,
(a) a horizontal table having an upper face adapted to have a printing form positioned thereon with an impression sheet overlying characters and design in relief on an upper surface thereof,
(b) said table having an exhaust connection for withdrawing air from above said table,
(c) means operatively connected to said table to impart substantially uniform vertical vibratory movement thereto,
(d) a frame removably mounted on said table in surrounding relation to said character and design carrying form positioned on said table, said frame having sealing engagement with the upper face of said table,
(e) said frame having a continuous upwardly opening groove therearound,
(f) a flexible seal member in said groove for the length thereof,
(g) an impervious flexible film extending across said frame and having marginal portions in said continuous groove engaged with the flexible seal member therein,
(h) a rigid bar coextensive with said flexible seal member and held in said groove to tightly engage the film margins to hold same in air-tight sealing engagement with the flexible seal member whereby in response to exhaust of air from above the table within the frame said film is drawn toward said table to hold an impression sheet in overlying engagement with a printing form thereon,
(i) and movable means positioned over said film and responsive to said vibratory movement of the table to impact the area of said film in small portions and transmit said impacts through the film to an impression sheet thereunder.

3. In a reproduction impression producing apparatus wherein an impression is made on a sheet overlying a character and design carrying surface of a form by vibratory impacting said sheet by a plurality of impact objects comprising,
(a) a horizontal table having an upper face adapted to have a form positioned thereon with the upper surface of the form having characters and design in relief thereon and an impression sheet positioned thereover,
(b) said table having an exhaust connection for withdrawing air from above said table,
(c) means operatively connected to said table to impart substantially uniform vertical vibratory movement thereto,
(d) a frame removably mounted on said table in surrounding relation to said character and design carrying form positioned on said table, said frame having sealing engagement with the upper face of said table,
(e) said frame having a continuous upwardly opening groove therearound,
(f) a flexible seal member in said groove for the length thereof,
(g) an impervious flexible film extending across said form in overlying relation to the impression sheet thereon and having marginal portions in said continuous groove engaged with the flexible seal member therein,
(h) a rigid bar held in said groove to tightly engage the film margins to hold same in sealing engagement with the flexible seal member whereby in response to exhaust of air from above the table within the frame said film is drawn toward said table to hold the impression sheet in overlying engagement with said form,
(i) a cell having a flexible bottom wall and a multiplicity of balls loose therein,
(j) and means positioning said cell on said frame with said bottom wall overlying the film of the frame whereby vibration of said table effects vertical movement of said balls to apply multiple impacts transmitted through said bottom wall and film to said impression sheet overlying said form.

4. An apparatus as set forth in claim 3 wherein said cell structure consists of:
(a) a second frame removably mounted on said first frame and having an upper and lower face, said second frame having a continuous downward opening groove therearound in said lower face,
(b) a downwardly facing flexible seal member on said second frame for the length thereof,
(c) an impervious flexible film forming the bottom wall of the cell and extending across said second frame in underlying relation and having marginal portions engaged with the downwardly facing flexible seal member,
(d) a rigid bar held secured to said second frame to tightly engage the film and hold same in engagement with the flexible seal member of said second frame,
(e) and a wall member extending across said second frame in upwardly spaced relation to the film secured thereto and having marginal portions secured to said second frame to form a chamber between the film and wall containing said impact members.

5. An apparatus as set forth in claim 4 wherein,
(a) said first-named frame is removably hinged to said table and said second-named frame is removably hinged to said first-named frame whereby said second frame may be independently swung upwardly from the first-named frame and both frames may be swung collectively upwardly from said table.

6. An apparatus as set forth in claim 3 wherein the means for imparting vibratory movement to the table includes,
(a) a support,
(b) a shaft rotatable on the support and spaced below the table,
(c) means on the shaft and operative in response thereto to impart an oscillatory movement,
(d) a resilient connector between the means on the shaft and the table for transmitting the oscillatory movement thereto, (e) a plurality of resilient means disposed in spaced relation and equally spaced from the table center and having supporting engagement with said table, (f) and a vertically adjustable means on the support for each of said resilient means and engaged therewith and operative to move the respective resilient means to level the table and support said resilient means for cooperation with the resilient connector transmitting the oscillatory movement to the table to provide the uniformity in the vibratory motion in amplitude and frequency over the surface of the table.

7. In a reproduction impression producing apparatus wherein an impression is made on a sheet overlying a design in relief by vibratory impacting said sheet by a plurality of impact objects comprising, (a) a horizontal table having an upper surface adapted to have a block positioned thereon with the block having an upper surface with a design in relief thereon, (b) said table having an exhaust connection for withdrawing air from above said table, (c) means adjustably and resiliently supporting said table for vertical movement, (d) means operatively connected to said table to impart vertical vibratory movement thereto, (e) a frame removably mounted on said table in surrounding relation to said block positioned on said table, said frame having an upper face and a lower face, (f) means on said frame at said lower face adapted to engage said table upper face and form a seal between the frame and table, (g) said frame having a continuous upwardly opening groove therearound in said upper face, (h) a flexible seal member in said groove for the length thereof, (i) an impervious flexible film extending across said block in overlying relation and having marginal portions in said continuous groove engaged with the flexible seal member therein, (j) a rigid bar held in said groove to tightly engage the film and hold same in sealing engagement with the flexible seal member whereby in response to exhaust of air from within the frame between the table and film said film is drawn toward said table to hold a copy sheet in overlying engagement with said block, (k) a cell having a flexible bottom wall and a multiplicity of impact members loose therein, (l) and means positioning said cell on said frame with said bottom wall overlying the film of the frame whereby vibration of said table effects vertical movement of said impact members to apply multiple impacts transmitted through said bottom wall and film to said impression sheet overlying said block.

8. In a reproduction impression producing apparatus wherein a copy is made on a copy sheet overlying a block having a design in relief by vibratory impacting said copy sheet by a plurality of impact objects comprising, (a) a support, (b) a table having a top surface adapted to support a design carrying block positioned thereon and having exhaust connection for withdrawing air from above said surface, (c) a shaft rotatable on the support and spaced below the table, (d) means on the shaft and operative in response thereto to impact an oscillatory movement, (e) a resilient connector between the means on the shaft and the table for transmitting the oscillatory movement thereto, (f) a plurality of resilient means exposed in spaced relation and equally spaced from the table center and having supporting engagement with said table, (g) a vertically adjustable means on the support for each of said resilient means and engaged therewith and operative to move the respective resilient means to level the table and support said resilient means for cooperation with the resilient connector transmitting the oscillatory movement to the table to provide uniformity in the vibratory motion in amplitude and frequency over the surface of the table, (h) a frame removably mounted on said table in surrounding relation to said copy carrying block positioned on said table, said frame having sealing engagement with the upper face of said table, (i) said frame having a continuous upwardly opening groove therearound, (j) a flexible seal member in said groove for the length thereof, (k) an impervious flexible film extending across said copy carrying block in overlying relation thereto and having marginal portions in said continuous groove engaged with the flexible seal member therein, (l) a rigid bar held in said groove to tightly engage the film margins to hold same in sealing engagement with the flexible seal member whereby in response to exhaust of air from above the table within the frame said film is drawn toward said table to hold the copy sheet in overlying engagement with the copy carrying block, (m) a cell having a flexible bottom wall and a multiplicity of impact members loose therein, (n) and means positioning said cell on said frame with said bottom wall overlying the film of the frame whereby vibration of said table effects vertical movement of said impact members to apply multiple impacts transmitted through said bottom wall and film to said copy sheet overlying the copy carrying block.

References Cited by the Examiner

UNITED STATES PATENTS

| | | | |
|---|---|---|---|
| 1,004,327 | 9/11 | Williams | 25—41 |
| 1,032,839 | 7/12 | Kimler | 38—103.91 |
| 1,411,908 | 4/22 | Cacici | 38—103.91 |
| 1,908,104 | 5/33 | Bell | 25—41 |
| 2,441,097 | 5/48 | Hicks | 18—19 |
| 2,448,316 | 8/48 | Lesavoy | 18—1 |
| 2,493,439 | 1/50 | Braund | 18—19 |
| 2,610,040 | 9/52 | Emmons | 25—41 |
| 2,702,411 | 2/55 | Winstead | 18—19 |
| 2,926,385 | 3/60 | Wilson | 18—19 |
| 3,061,881 | 11/62 | Sherno | 18—19 |
| 3,072,964 | 1/63 | Tilden | 18—19 |
| 3,113,342 | 12/63 | Halpern et al. | 18—1 |
| 3,118,178 | 1/64 | Alles | 18—5 |

FOREIGN PATENTS

| | | |
|---|---|---|
| 1,078,144 | 3/60 | Germany. |

WILLIAM J. STEPHENSON, *Primary Examiner.*